P. Hittel, 8806x
Truss.
Patented May 2, 1835.
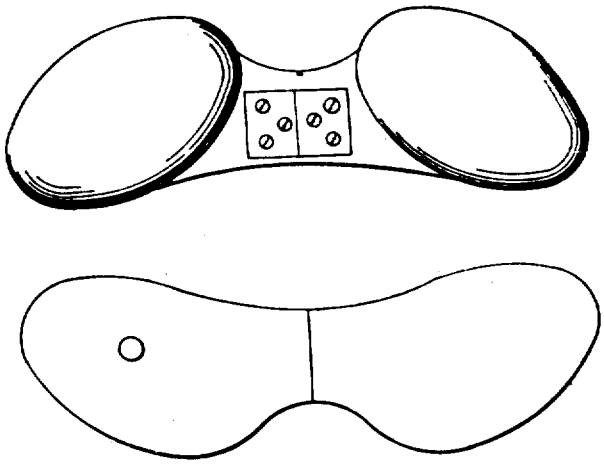

8806X May 2. 1835 24

Philip Hittel.
Letters Patent

The schedule referred to in these Letters Patent, and making part of the same containing a description in the words of the said Philip Hittel himself, of his improvement in the Truss called the improved common convex Truss —

---

The deficiency experienced for the want of a good Truss for the proper support of the Protended viscera in hernial affections and ultimately performing a radical cure will always render an investigation of this painful malady interesting. Before describing my improvement, I shall briefly state some of the imperfections attending all other Trusses. 1st in all cases where the person is ruptured on one side (speaking generally), in common practice the Truss is alone applied to the affected side. Now experience has undoubtedly confirmed that whatever may have been the cause of rupture either by violence, exertion or by a predisposition of weakness of the parts. 2d, or that in all cases of aggravated or scrotal Hernia where such pressure is requisite for the retention of the intestine as to change the internal position of any of the abdominal viscera from the position, which nature alone adapted. It is evident the weight or force undoubtedly will preponderate to the opposite side and will cause or facilitate the production of another rupture which would not have occurred under any other circumstances of ordinary exertions; By the annexed description of my improved Truss I believe all the objections to other Trusses are obviated in my improvement, which consists of two small boards or blocks of wood, ivory, or any other material may be substituted, between 4 or 5 inches long, one inch thick, and sufficiently broad to extend to each groin, curved in the shape or form of the upper half of a heart, flat on the outside and convex on the inner and extreme ends of the upper side. In carving the inner side great care will be requisite in forming the projection immediately at the extreme ends in order that it makes the principle pressure on the sack immediately at the aperture which in order to accomplish the pad curved on the inner sides precisely resembles a gord with the stem projecting downwards whilst the inner and lower edge is carved flat with a hollow in the middle of the lower part so as to sett without producing any uncomfortable pressure in the pubis, or pain,
joined in the centre by a hinge in order to adapt itself the more ready, to the
different position of the body, or the principle of applying the two convex or goic
shaped pads may if preferred be united by extending a piece of brass or tin
fastned on each ends of the pads by means of a screw in the center, of this
plate, the spring should be fastned by means of a rivet or a small brass slide
can be substituted, by which means the person can more readily lengthen or
shorten the spring as the case may require - Being now finished, the whole
should be covered simply with buckskin after which you fasten the one
end of the spring on the rupture, pad or portion thereby making lateral pres
-sure on the other portion or side when placing the spring around the body and
for the better security a bandage may be attached to the back pad passing
it around the other portion of the body and fastned by means of a knob on
the front pad - By this improved common convex truss I claim every prin
-ciple of equal pressure of the convex pad, curved or cast on a plate of any
material whatsoever. United in the centre by a hinge thereby making equal
pressure. With the largest diameter of the convex portion above, gradually les
-sening downwards whilst giving general support to the lower parietes of the
abdomen agreeably to the accompanying specifications and drawings all
which I find to answer perfectly well -

Witnesses
Samuel D. Rose
Peter Snyder

Philip Hittel

Exd.
M.G.C.

May 2. 1835 Patented

[650 ...

(Drawing)